United States Patent
Yang

(10) Patent No.: US 7,564,705 B2
(45) Date of Patent: *Jul. 21, 2009

(54) SYNCHRONOUS RECTIFICATION CIRCUIT FOR POWER CONVERTERS

(75) Inventor: Ta-Yung Yang, Taoyuan County (TW)

(73) Assignee: System General Corp., Taipei Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/208,594

(22) Filed: Sep. 11, 2008

(65) Prior Publication Data

US 2009/0003019 A1 Jan. 1, 2009

Related U.S. Application Data

(63) Continuation of application No. 11/464,078, filed on Aug. 11, 2006, now Pat. No. 7,440,298.

(51) Int. Cl.
*H02M 7/217* (2006.01)

(52) U.S. Cl. .................. 363/89; 363/127

(58) Field of Classification Search .......... 363/89, 363/127

See application file for complete search history.

(56) References Cited

U.S. PATENT DOCUMENTS

| | | | | |
|---|---|---|---|---|
| 6,995,991 | B1 * | 2/2006 | Yang et al. | 363/21.14 |
| 7,440,298 | B2 * | 10/2008 | Yang | 363/89 |
| 2008/0037302 | A1 * | 2/2008 | Yang | 363/127 |
| 2009/0003019 | A1 * | 1/2009 | Yang | 363/21.06 |

* cited by examiner

*Primary Examiner*—Jeffrey L Sterrett
(74) *Attorney, Agent, or Firm*—J.C. Patents

(57) ABSTRACT

A synchronous rectification circuit for power converters operable under fixed and/or variable frequencies where no current sense circuit or phase-lock circuit are needed is provided. It has a power switch coupled to a transformer for the rectification. A signal-generation circuit is used for generating a control signal in response to a magnetized voltage of the transformer, a demagnetized voltage of the transformer, and a magnetization period of the transformer. The control signal is coupled to turn on the power switch. The enable period of the control signal is correlated to a demagnetization period of the transformer.

11 Claims, 5 Drawing Sheets

US 7,564,705 B2

SYNCHRONOUS RECTIFICATION CIRCUIT FOR POWER CONVERTERS

CROSS-REFERENCE TO RELATED APPLICATION

This is a continuation application of patent application Ser. No. 11/464,078, filed on Aug. 11, 2006, which is now allowed. The entirety of the above-mentioned patent application is hereby incorporated by reference herein and made a part of this specification.

BACKGROUND OF THE INVENTION

1. Field of the Invention

The present invention relates to power converter, and more specifically relates to a control circuit of switching power converter.

2. Description of Related Art

FIG. 1 shows a traditional power converter with a synchronous rectifier, for improving the efficiency of power conversion. A magnetic device such as a transformer 10 includes a primary winding $N_P$ and a secondary winding $N_S$. A switch 15 is connected to the primary winding $N_P$ for switching the transformer 10 and for regulating the output of the power converter. The secondary winding $N_S$ is coupled to the output of the power converter through a power switch 20 and a capacitor 30. The power switch 20 and its body diode 25 are operated as the synchronous rectifier. A voltage $V_E$ is applied to the primary winding $N_P$ in response to the turning-on of the switch 15 during the magnetization period. Therefore, a charge current $I_C$ is generated in accordance with the voltage $V_E$ and inductance of the primary winding $N_P$. Meanwhile, a magnetized voltage $V_S$ is produced at the secondary winding $N_S$. Once the switch 15 is turned off, the energy of the transformer 10 is delivered to the output of the power converter through the secondary winding $N_S$ and the power switch 20. A demagnetized voltage (the output voltage $V_O$) is thus applied to the secondary winding $N_S$ during the demagnetization period. A discharge current $I_D$ is generated according to the demagnetized voltage and the inductance of the secondary winding $N_S$.

$$I_C = \frac{V_E}{L_P} \times T_{CHARGE} \quad (1)$$

$$I_D = \frac{V_O}{L_S} \times T_{DISCHARGE} \quad (2)$$

where $L_P$ and $L_S$ are the inductances of the primary winding $N_P$ and the secondary winding $N_S$ of the transformer 10, respectively. $T_{CHARGE}$ is the magnetization period; and $T_{DISCHARGE}$ is the demagnetization period.

In continuous current mode (CCM) operation, the switch 15 is turned on before the transformer 10 is completely demagnetized. Under the discontinuous current mode (DCM), the energy in the transformer 10 is fully demagnetized before the start of the next switching cycle. FIGS. 2A and 2B show the waveforms of the DCM and CCM, respectively. If the power switch 20 is not turned off after the transformer 10 is fully demagnetized, a reverse current will be flowed to the power switch 20 to discharge the capacitor 30. This reverse current decreases the efficiency of the power converter. In order to avoid the reverse current, a conventional method had been proposed for the synchronous rectification, such as in "PWM controller for synchronous rectifier of flyback power converter" by Yang et al., U.S. Pat. No. 6,995,991. A resistor 40 and its control circuit 45 are used to turn off the power switch 20 once the discharge current $I_D$ is lower than a threshold value. Furthermore, a phase-lock circuit is equipped to turn off the power switch 20 before the start of the next switching cycle during the CCM operation. Nevertheless, the current detection and the phase-lock circuit produce power losses and add complexity to the system. Furthermore, a wide variable frequency system, such as a resonant power converter, causes problems for phase locking.

SUMMARY OF THE INVENTION

The present invention provides a synchronous rectification circuit that is applicable for use in power converters operating under fixed frequency and/or variable frequency. No current sense circuit or phase-lock circuit is needed. The synchronous rectification circuit comprises a power switch coupled to a transformer (a magnetic device) for the rectification. A signal-generation circuit is used for generating a control signal in response to a magnetized voltage of the transformer, a demagnetized voltage of the transformer, and a magnetization period of the transformer. The control signal is coupled to turning on the power switch. The enable period of the control signal is correlated to a demagnetization period of the transformer. Furthermore, the control signal is increased in response to the increase of the magnetized voltage. The control signal is decreased in response to the decrease of the magnetization period of the transformer. Besides, the control signal is decreased in response to the increase of the demagnetized voltage.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

DESCRIPTION OF THE EMBODIMENTS

Figure 1:
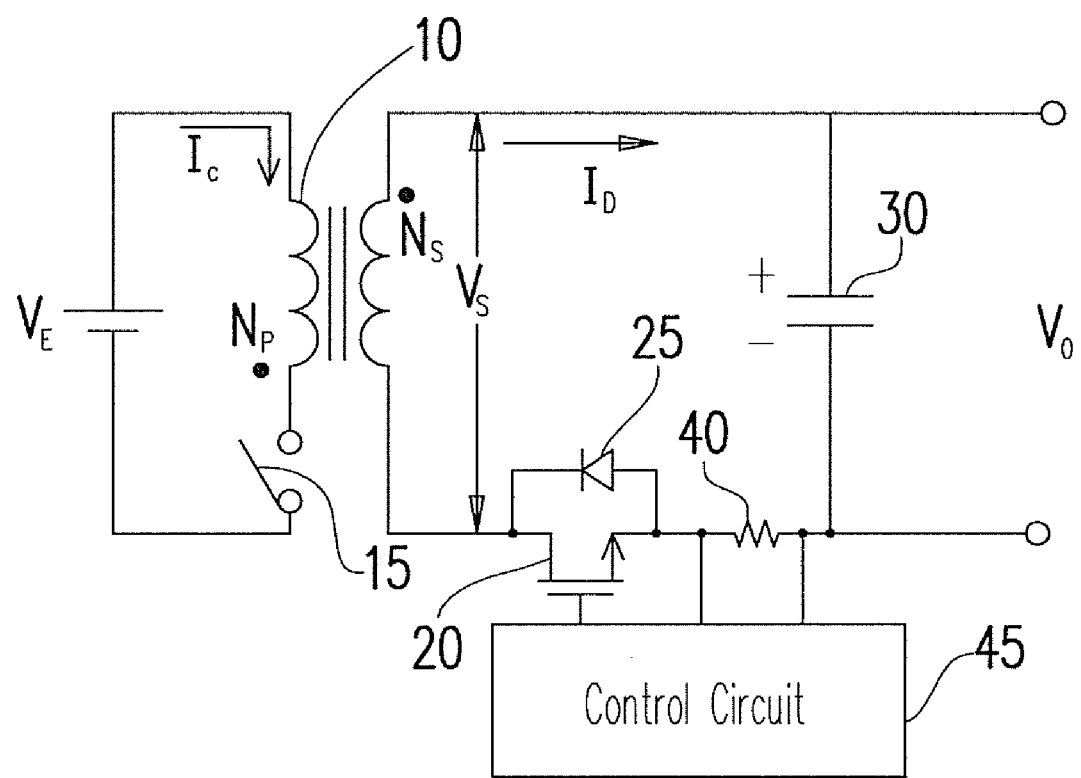
FIG. 1 shows a traditional power converter with synchronous rectifier.
Figure 2A:
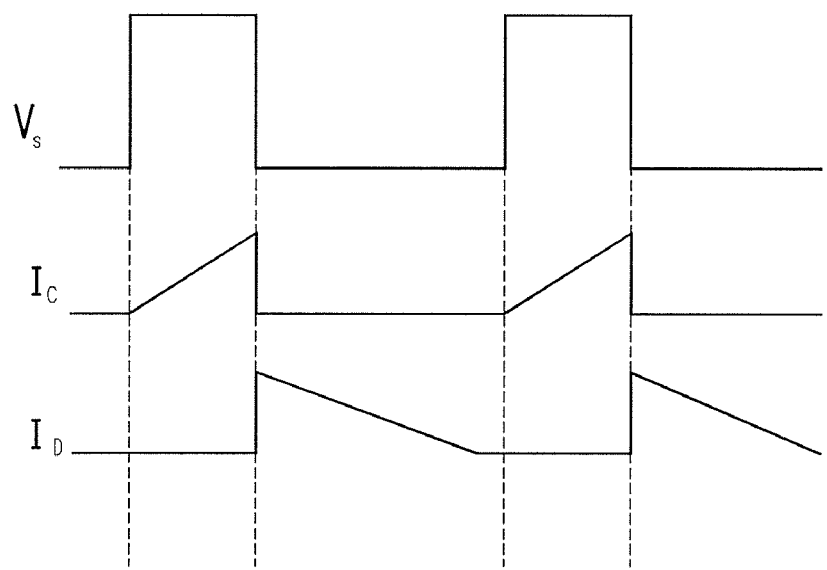
FIGS. 2A and 2B show the waveforms of the DCM and CCM, respectively.
Figure 2B:
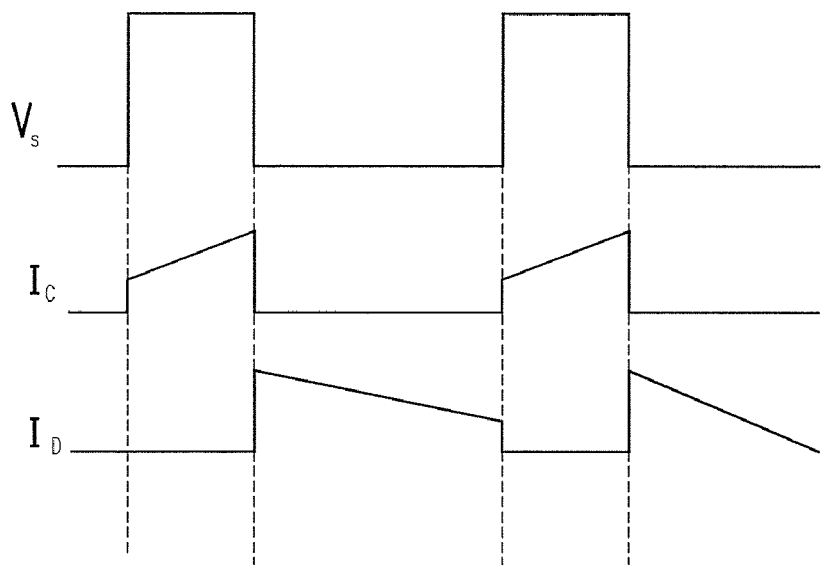
Figure 3:
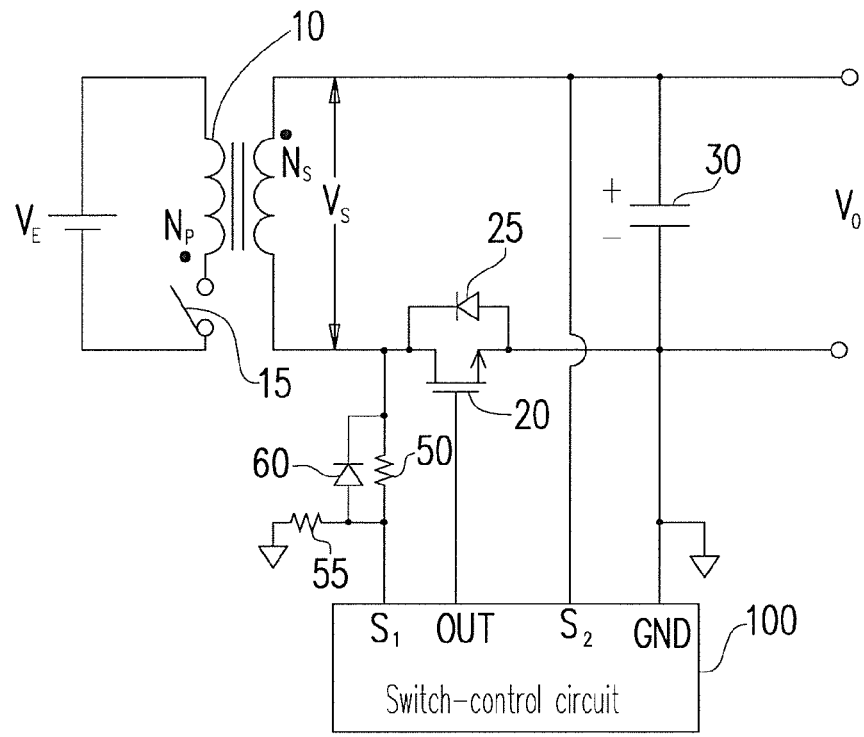
FIG. 3 shows a power converter including a synchronous rectification circuit in accordance with an embodiment of the present invention.

FIG. 3 shows a switching power converter comprising a synchronous rectification circuit in accordance with an embodiment of the present invention that is applicable for use in power converters operating under fixed frequency and/or variable frequency. No current sense circuits or phase-lock circuits are needed. The power switch 20 is coupled to the transformer 10 (the magnetic device) for the rectification. A switching-control circuit 100 is used for generating a control signal $S_W$ in response to a magnetized voltage $V_S$, a demagnetized voltage, and a magnetization period of the transformer 10. The control signal $S_W$ is coupled to turn on the power switch 20. The enable period of the control signal $S_W$ is correlated to a demagnetization period of the transformer.

When the switch 15 is turned on, a voltage $V_{DS}$ is produced in between the secondary winding $N_S$ and the power switch 20. The voltage $V_{DS}$ is related to the magnetized voltage ($V_S$) of the transformer 10.

$$V_S = V_{DS} - V_O \quad (3)$$

When the switch 15 is turned off, the output voltage $V_O$ is applied to the secondary winding $N_S$ for the demagnetization. The output voltage $V_O$ is thus correlated to the demagnetized voltage of the transformer 10. An input terminal $S_1$ of the switching-control circuit 100 is coupled to detect the voltage $V_{DS}$ through a plurality of resistors 50 and 55. A diode 60 is farther coupled to the secondary winding $N_S$ to speed up the detection of the voltage $V_{DS}$. Another input terminal S2 is coupled to the output of the power converter for receiving the output voltage $V_O$.

The magnetization flux $\Phi_C$ of the transformer is equal to the demagnetization flux $\Phi_D$. The equality is shown as, $$\Phi_C = \Phi_D \quad (4)$$

$$\Phi = B \times Ae = \frac{V \times T}{N} \quad (5)$$

$$\frac{V_E}{N_P} \times T_{CHARGE} = \frac{V_O}{N_S} \times T_{DISCHARGE} \quad (6)$$

$$V_E \times T_{CHARGE} = \frac{N_P}{N_S} \times V_O \times T_{DISCHARGE} \quad (7)$$

$$V_E = \frac{N_P}{N_S} \times V_S \quad (8)$$

where B is the flux density, Ae is the cross-section area of the transformer, T is the magnetization period ($T_{CHARGE}$) or the demagnetization period ($T_{DISCCHARGE}$) of the transformer, and N is the number of winding turns of the transformer.

The demagnetization period ($T_{DISCHARGE}$) of the transformer 10 can be obtained in accordance with equations (7) and (8).

$$T_{DISCHARGE} = \frac{V_S}{V_O} \times T_{CHARGE} \quad (9)$$

The equation (9) shows that the demagnetization period ($T_{DISCHARGE}$) can be predicted in accordance with the magnetized voltage $V_S$, the demagnetized voltage $V_O$, and the magnetization period ($T_{CHARGE}$). According to the equations (3) and (9), the demagnetization period ($T_{DISCHARGE}$) can be rewritten as the following:

$$T_{DISCHARGE} = \frac{(V_{DS} - V_O)}{V_O} \times T_{CHARGE} \quad (10)$$

The enable period of the control signal $S_W$ is generated in accordance with the demagnetization period ($T_{DISCHARGE}$) of the transformer 10. Therefore, the enable period of the control signal $S_W$ is increased in response to the increase of the magnetized voltage $V_S$. The enable period of the control signal $S_W$ is decreased in response to the decrease of the magnetization period ($T_{CHARGE}$) of the transformer 10. Besides, the enable period of the control signal $S_W$ is decreased in response to the increase of the demagnetized voltage $V_O$.

Figure 4:
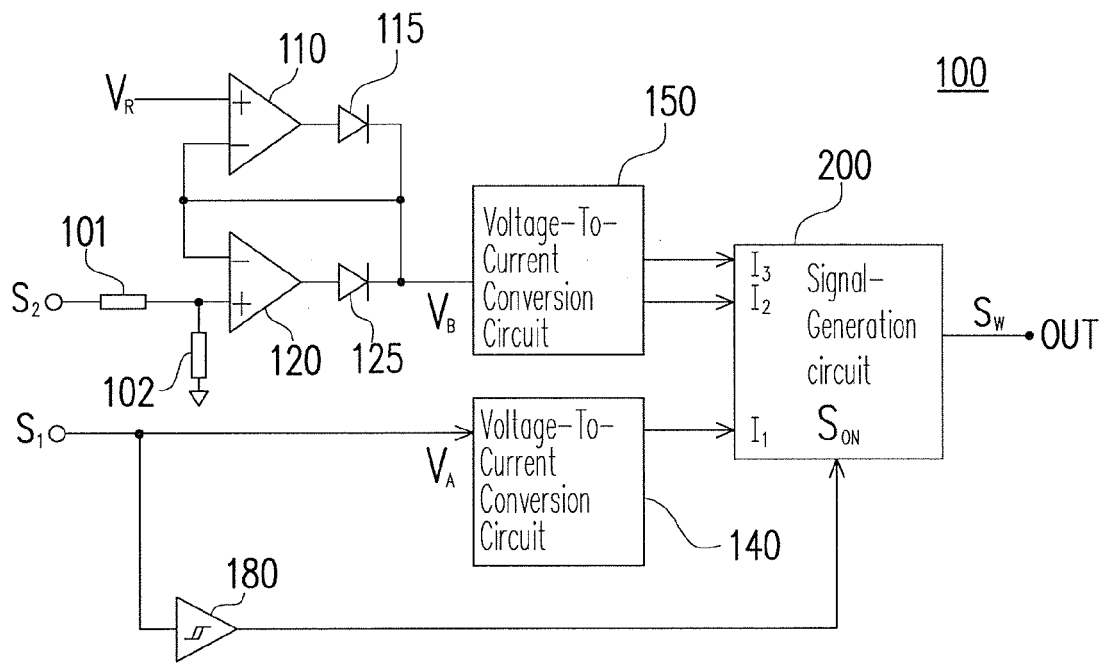
FIG. 4 shows a switching-control circuit according to the embodiment of the present invention.

FIG. 4 shows the switching-control circuit 100 according to an embodiment of the present invention. An input circuit includes a plurality of operational amplifiers 110, 120, diodes 115, 125, voltage-to-current conversion circuits 140, 150, resistive devices 101, 102, and a hysterias-buffer circuit 180. The operational amplifier 110 and the diode 115 form a first unit-gain buffer supplied by the reference signal $V_R$. The operational amplifier 120 and the diode 125 form a second unit-gain buffer coupled to the input terminal $S_2$ through the resistive devices 101 and 102. The output of the first unit-gain buffer and the output of the second unit-gain buffer are tied together to generate the signal $V_B$. The reference signal $V_R$ clamps the minimum value of the signal $V_B$. The signal $V_B$ is connected to the voltage-to-current conversion circuit 150 to generate a second signal $I_2$, and a third signal $I_3$ in response to the output voltage $V_O$. The minimum value of the second signal $I_2$ is clamped to a limit value. The input terminal $S_1$ produces a voltage signal $V_A$ that is connected to the voltage-to-current conversion circuit 140 to generate a first signal $I_1$ in response to the voltage $V_{DS}$. Furthermore, the hysterias-buffer circuit 180 is coupled to the input terminal $S_1$ to generate a switching signal $S_{ON}$ in response to the magnetization period of the transformer 10. The first signal $I_1$, the second signal $I_2$, the third signal $I_3$, and the switching signal $S_{ON}$ are coupled to the signal-generation circuit 200 to generate the control signal $S_W$.

Figure 5:
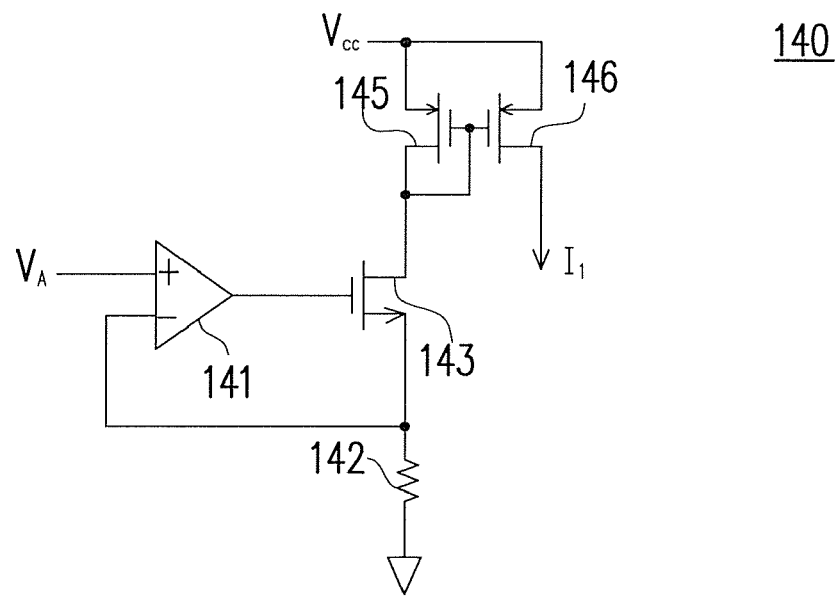
FIGS. 5 and 6 show the schematics of a plurality of voltage-to-current conversion circuits according to the embodiment of the present invention.
Figure 6:
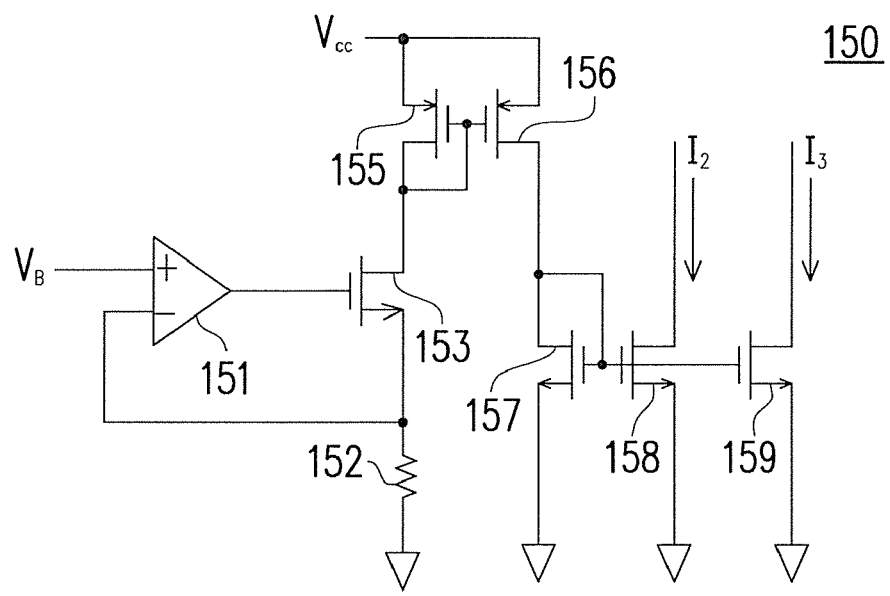

FIGS. 5 and 6 show the voltage-to-current conversion circuits 140 and 150 according to the embodiment of the present invention, respectively. The voltage $V_A$ is connected to an operational amplifier 141. The operational amplifier 141 is connected to a transistor 143 and a resistor 142 for generating a current $I_{143}$ in response to the voltage $V_A$. The current $I_{143}$ is connected to a plurality of transistors 145 and 146 to generate the first signal $I_1$. The voltage $V_B$ is connected to an operational amplifier 151. The operational amplifier 151 is connected to a transistor 153 and a resistor 152 for generating a current $I_{153}$ in response to the voltage $V_B$. The current $I_{153}$ is connected to a plurality of transistors 155 and 156 to generate a current $I_{156}$. The current $I_{156}$ is further connected to a plurality of transistors 157, 158 and 159 for generating the second signal $I_2$ and the third signal $I_3$. Therefore the first current $I_1$ is generated in accordance with the voltage $V_A$. The second signal $I_2$ and the third signal $I_3$ are generated in accordance with the voltage $V_B$.

Figure 7:
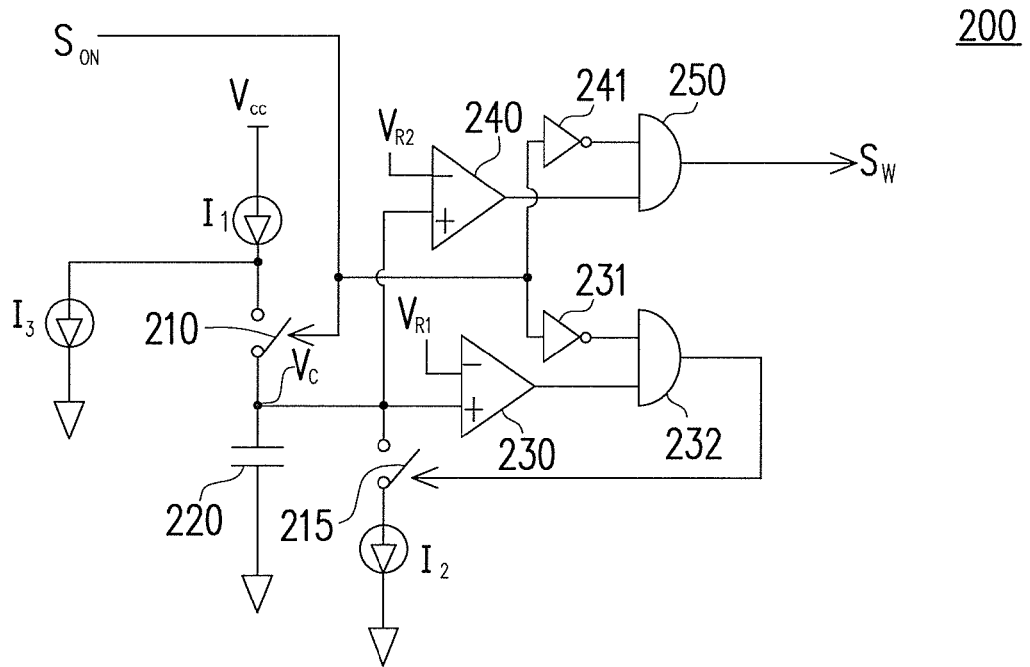
FIG. 7 shows a signal-generation circuit according to the embodiment of the present invention.

FIG. 7 shows the signal-generation circuit 200. A capacitor 220 is utilized to determine the period of the control signal $S_W$. A first switch 210 is coupled in between the first signal $I_1$ and the capacitor 220. A second switch 215 is coupled in between the second signal $I_2$ and the capacitor 220. A first comparator 230 is coupled to the capacitor 220 for generating a first-control signal at the output of the first comparator 230 once the voltage of the capacitor 220 is higher than a first reference voltage $V_{R1}$. An output circuit formed by an inverter 231 and an AND gate 232 is coupled to generate a first discharge signal at the output of the AND gate 232 in response to the enabling of the first-control signal and the disabling of the switching signal $S_{ON}$. The switching signal $S_{ON}$ is further coupled to control the first switch 210. The first switch 210 is turned on in response to the enabling of the switching signal $S_{ON}$. The first discharge signal is coupled to control the second switch 215. The second switch 215 is turned on in response to the enabling of the first discharge signal. The first signal $I_1$ is used for charging the capacitor 220. The second signal $I_2$ is utilized for discharging the capacitor 220. The third signal $I_3$ is further coupled to the first signal $I_1$ to decrease the value of the first signal $I_1$.

The voltage $V_{DS}$ determines the first signal $I_1$. The first signal $I_1$ can be expressed as, $$I_1 = k1 \times \frac{V_{DS}}{R_{142}} \quad (11)$$

The output voltage $V_O$ determines the second signal $I_2$ and the third signal $I_3$ as the following:

$$I_2 = k2 \times \frac{V_O}{R_{152}} \quad (12)$$

$$I_3 = k3 \times \frac{V_O}{R_{152}} \quad (13)$$

The voltage on the capacitor 220 can be expressed as, $$V_C = \frac{I_1 - I_3}{C} \times T_{ON} \quad (14)$$
$$= \frac{\frac{k1 \times V_{DS}}{R_{142}} - \frac{k1 \times V_O}{R_{152}}}{C} \times T_{ON}$$

where k1, k2 and k3 are constants such as the ratio of resistive devices and/or the gain of current mirror, C is the capacitance of the capacitor 220, $T_{ON}$ is enable time of the switching signal $S_{ON}$ (the charge time of the capacitor 220), $R_{142}$ is the resistance of the resistor 142, and $R_{152}$ is resistance of the resistor 152. The discharge time $T_{OFF}$ of the capacitor 250 is given by, $$T_{OFF} = \frac{C \times V_C}{I_2} \quad (15)$$
$$= \frac{C \times V_C}{k2 \times \frac{V_O}{R_{152}}}$$

By properly selecting k1, k2, k3, $R_{142}$, and $R_{152}$, the discharge time $T_{OFF}$ of the capacitor 250, can be rewritten according to equations (14) and (15):

$$T_{OFF} = K \times \frac{V_{DS} - V_O}{V_O} \times T_{ON} \quad (16)$$

The discharge time $T_{OFF}$ of the capacitor 250 is therefore corresponded to the demagnetization period $T_{DISCHARGE}$ of the transformer 10.

$$T_{DISCHARGE} = K \times \frac{V_S}{V_O} \times T_{CHARGE} \quad (17)$$

where K is a constant.

A second comparator 240 is coupled to the capacitor 220 to generate a second control signal at the output of the second comparator 240 once the voltage of the capacitor 220 is higher than a second reference voltage $V_{R2}$. Another output circuit formed by an inverter 241 and an AND gate 250 is coupled to generate a second discharge signal at the output of the AND gate 250 in response to the enabling of the second-control signal and the disabling of the switching signal $S_{ON}$. The control signal $S_W$ can be generated in accordance with the first discharge signal or the second discharge signal. The second discharge signal is utilized to generate the control signal $S_W$ in this embodiment. The second reference voltage $V_{R2}$ is higher than the first reference voltage $V_{R1}$. Therefore, the control signal $S_W$ is disabled and the power switch 20 is turned off before the magnetizing of the transformer 10.

Figure 8:
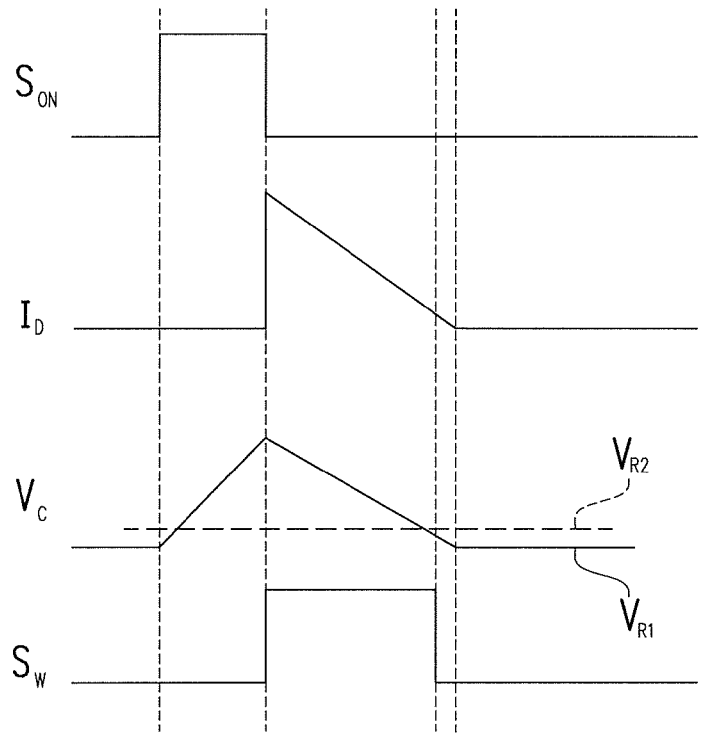
FIG. 8 shows a plurality of waveforms of the synchronous rectification circuit in accordance with the embodiment of the present invention.

Referring to equation (16) and the waveforms of the synchronous rectification circuit of FIG. 8, the period of the control signal $S_W$ is controlled by the discharge time $T_{OFF}$ of the capacitor 250 (the voltage $V_C$). The period of the control signal $S_W$ is decreased in response to the decrease of the charge time $T_{ON}$ of the capacitor 250. The period of the control signal $S_W$ is increased in response to the decrease of the output voltage $V_O$. The charge time $T_{ON}$ is controlled by the enable time of the switching signal $S_{ON}$ which is correlated to the magnetization period ($T_{CHARGE}$).

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A synchronous rectification circuit for a power converter, comprising:
    a power switch, coupled to a magnetic device for rectification; and
    a switching-control circuit, generating a control signal in response to a magnetized voltage of the magnetic device and a demagnetized voltage of the magnetic device,
    wherein the control signal is coupled to control the power switch to determine a demagnetization period of the magnetic device.

2. The synchronous rectification circuit as claimed in claim 1, wherein a magnetization period of the magnetic device is utilized to determine an enable period of the control signal.

3. The synchronous rectification circuit as claimed in claim 1, wherein an enable period of the control signal is increased in response to the increase of the magnetized voltage.

4. The synchronous rectification circuit as claimed in claim 1, wherein an enable period of the control signal is decreased in response to the decrease of a magnetization period of the magnetic device.

5. The synchronous rectification circuit as claimed in claim 1, wherein an enable period of the control signal is decreased in response to the increase of the demagnetized voltage.

6. The synchronous rectification circuit as claimed in claim 1, wherein the switching-control circuit, comprising:
    an input circuit, generating a first signal, a second signal, a third signal and a switching signal; and a signal-generation circuit, coupled to the input circuit to generate the control signal, wherein the first signal is correlated to a voltage of the magnetic device, the second signal and the third signal are correlated to an output voltage of the power converter, and the switching signal is generated in response to a magnetization period of the magnetic device.

7. The synchronous rectification circuit as claimed in claim 6, wherein a minimum value of the second signal is clamped to a limit value.

8. The synchronous rectification circuit as claimed in claim 6, wherein the signal-generation circuit, comprising:
a capacitor;
a first switch, coupled in between the first signal and the capacitor;
a second switch, coupled in between the second signal and the capacitor;
a first comparator, coupled to the capacitor to generate a first-control signal once the voltage of the capacitor is higher than a first reference voltage; and
an output circuit, coupled to generate a first discharge signal in response to the enabling of the first-control signal and the disabling of the switching signal, wherein the first switch is turned on in response to the enabling of the switching signal, the second switch is turned on in response to the enabling of the first discharge signal, wherein the first signal is used for charging the capacitor, the second signal is utilized to discharge the capacitor, and the third signal is further coupled to the first signal to decrease the value of the first signal.

9. The synchronous rectification circuit as claimed in claim 8, wherein the signal-generation circuit, further comprising:
a second comparator, coupled to the capacitor to generate a second control signal once the voltage of the capacitor is higher than a second reference voltage, wherein the control signal is generated in accordance with the first discharge signal or a second discharge signal.

10. The synchronous rectification circuit as claimed in claim 1, wherein the power switch is turned off before magnetizing of the magnetic device.

11. The synchronous rectification circuit as claimed in claim 1, wherein the magnetic device is a transformer.

* * * * *